United States Patent [19]

Rhoads

[11] Patent Number: 4,907,899
[45] Date of Patent: Mar. 13, 1990

[54] THRUST BEARING ASSEMBLY FEATURE
[75] Inventor: T. G. Rhoads, Thomaston, Conn.
[73] Assignee: The Torrington Company, Torrington, Conn.
[21] Appl. No.: 316,884
[22] Filed: Feb. 28, 1989
[51] Int. Cl.⁴ .............................................. F16C 19/30
[52] U.S. Cl. .................................. 384/620; 384/617; 384/903
[58] Field of Search ............... 384/620, 617, 903, 585, 384/539, 537

[56] References Cited

U.S. PATENT DOCUMENTS

| | | | |
|---|---|---|---|
| 3,934,956 | 1/1976 | Pitner | 384/620 |
| 3,999,816 | 12/1976 | Pitner | 384/620 |
| 4,310,205 | 1/1982 | Condon et al. | 384/620 |
| 4,566,578 | 1/1986 | Leigh-Monstevens et al. | 384/617 |

Primary Examiner—Lenard A. Footland
Attorney, Agent, or Firm—Frank S. Troidl

[57] ABSTRACT

A thrust bearing assembly which facilitates the installation and assembly of the thrust bearing into a housing or onto a shaft. The thrust bearing assembly preferred embodiment comprises two thrust washers, a cage with rollers, an annular band which engages the outer periphery of the thrust washer, and at least one protrusion extending radially outwardly from the annular band. The protrusions have two edges—a leading edge and a non-leading edge. The non-leading edge is configured to make it impossible to insert the thrust bearing into a housing the wrong way. A modified non-leading edge configuration makes it impossible to slide a modified thrust bearing assembly onto a shaft.

7 Claims, 2 Drawing Sheets

THRUST BEARING ASSEMBLY FEATURE

This invention relates to thrust bearings which are assembled into a housing; more particularly, it relates to a thrust bearing assembly feature which includes an assembly retainer having dimples to retain the assembly to its pilot. Each dimple has a bevelled leading edge, which facilitates insertion of the assembly onto its pilot, and a blunt nonleading edge on the axial side of the bearing opposite the leading surface of the dimple. The non-leading edge prevents the assembly from being installed backwards, thus preventing premature bearing failure and related costs. This invention is especially well-suited for use in a situation where thrust bearings are assembled into a product at a very high rate and the chances for erroneous assembly are greatest.

Prior art patents disclose thrust bearings which have an assembly retainer with dimples. Examples of this type of prior art include U.S. Pat. No. 3,999,816 for a "Race Plate For A Thrust Needle Or Roller Bearing" issued in the name of Alfred Pitner on Dec. 28, 1976, and U.S. Pat. No. 4,168,869 for a "Combined Radial And Axial Bearing Device" issued in the name of Gerard Stephan on Sept. 25, 1979. Two additional prior art patents of relevance were both issued in the name of Kenji Tsuruki -- U.S. Pat. No. 4,725,153 for a "Thrust Roller Bearing Assembly" issued on Feb. 16, 1988, and U.S. Pat. No. 4,733,979 for a "Thrust Roller Bearing Assembly" issued on Mar. 29, 1988.

A prior art patent assigned to the Torrington Company discloses a thrust bearing having a similar retainer with dimples -- U.S. Pat. No. 4,310,205 for a "Thrust Washer Retaining Band" issued on Jan. 12, 1982, in the names of Charles E. Condon, Jr., Dean E. Johnston, and Charles W. Shattuck. This patent discloses dimples (protrusions extending radially outwardly) and retaining means.

The primary problem with these thrust bearing assemblies disclosed by the prior art is that the thrust bearings can generally be assembled, e.g. into a housing, by inserting the bearing into the housing with either side of the thrust bearing inserted first. In some products, it is critical that a certain side of the bearing be inserted first. Training of the assemblers as to which side of the thrust bearing should be inserted first cannot prevent thrust bearings from being assembled incorrectly occasionally. Even occasional errors of this type are unacceptable for certain products; therefore, it is important to provide a low-cost solution to this problem.

The thrust bearing assembly of the present invention solves this problem by providing dimples similar to the prior art, but with an important difference -- the dimples are configured to provide two distinctly different edges. The first edge, the leading edge, is bevelled to facilitate installation of the thrust bearing into a housing; the second edge, the non-leading edge, has a blunt configuration which impedes the installation of the bearing into a housing. The non-leading edge has an outer diameter which is slightly greater than the diameter of the housing pilot surface. This makes it impossible for an assembler to insert the thrust bearing into the housing in the wrong direction, or "backwards".

Briefly described, the thrust bearing assembly of this invention comprises a thrust washer with an annular flange around its outer periphery. The assembly also includes a cage which accommodates rolling elements, and an annular band which engages the outer periphery of the washer flange. The band has at least one protrusion which extends in a radially outwardly direction. Each protrusion, or dimple, has a leading edge and a non-leading edge. The leading edge is configured to facilitate insertion of the leading edge onto a pilot surface, while the non-leading edge is configured, to make it impossible to insert the thrust bearing "backwards".

This invention may be better understood by reference to the following detailed description and drawings in which.

In the various figures, like parts are referred to by like numbers.

Figure 1:
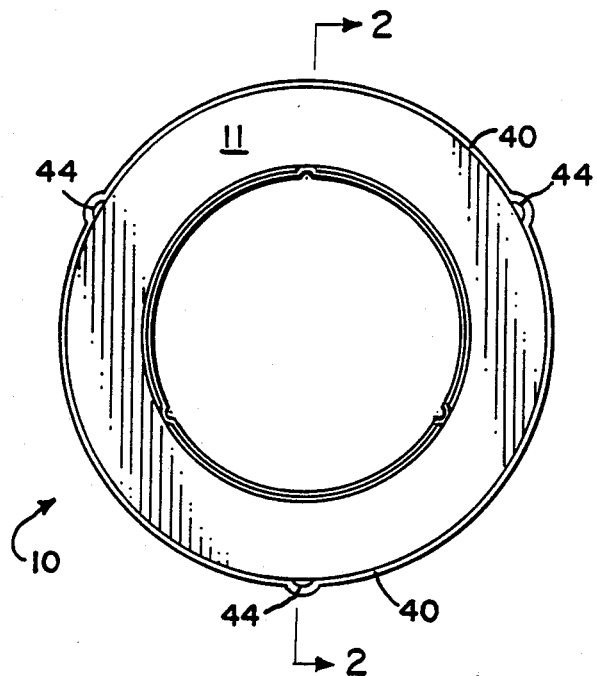
FIG. 1 is a front view of the preferred embodiment of the thrust bearing assembly of the present invention.
Figure 2:
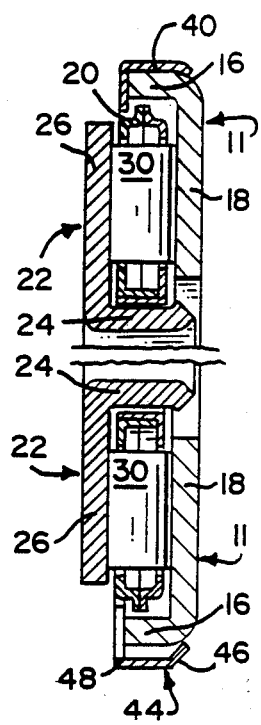
FIG. 2 is a sectional elevational view of the thrust bearing assembly shown in FIG. 1, taken along line 2—2 of FIG. 1.

Referring to the drawings, and more particularly to FIGS. 1 and 2, a thrust bearing assembly 10 comprises a radially extending annular thrust washer 11 having a flange 16 at its outer periphery and a radially-extending portion 18, an annular cage 20 which accommodates multiple rolling elements 30, an annular band 40 sized to make an interference fit with the outer periphery of flange 16, and a second thrust washer 22 having a flange 24 and a radially-extending portion 26. Band 40 has at least one protrusion or dimple 44 extending generally radially outwardly. In the preferred embodiment illustrated in FIG. 1, band 40 has three protrusions 44 equally spaced around the circumference of the band, approximately 120° (degrees) apart.

Figure 3:
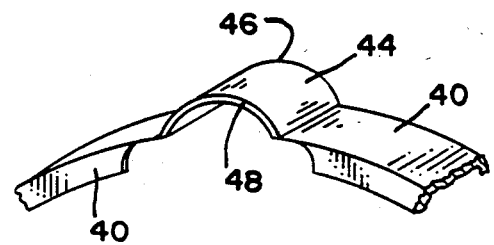
FIG. 3 is an enlarged fragmentary view of the annular band surrounding the outer periphery of the thrust bearing assembly shown in FIG. 1, with a dimple and its non-leading edge depicted in detail.
Figure 4:
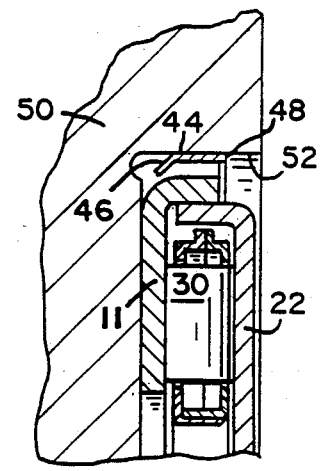
FIG. 4 is a fragmentary view, partially in section, of the thrust bearing assembly of FIG. 1 after it has been assembled with a pilot, e.g., of a housing.

Turning now to FIG. 3, the non-leading edge 48 is illustrated in some detail in an enlarged, fragmentary view. FIG. 4 shows the bearing assembly installed in a housing 50 having a pilot surface 52. The non-leading edge has an outer diameter which is greater than the diameter of the pilot surface, and edge 48 is also blunt. For these reasons, an assembler is unable to install the thrust bearing assembly 10 into the housing 50 with the non-leading edge 48 inserted first. By comparing the protrusion 44 of FIG. 2 with the protrusion in FIG. 4, it can be seen that the outer diameter of the protrusion is reduced when it is installed into a housing 50. The interference fit causes the outer surface of protrusion 44 to be pressed inwardly so that the bearing assembly 10 is snugly attached to the housing. The bearing assembly 10 is snugly attached to the housing. The leading edge 46 is tapered so that the minimum diameter is inserted onto the pilot surface 52 first.

Figure 5:
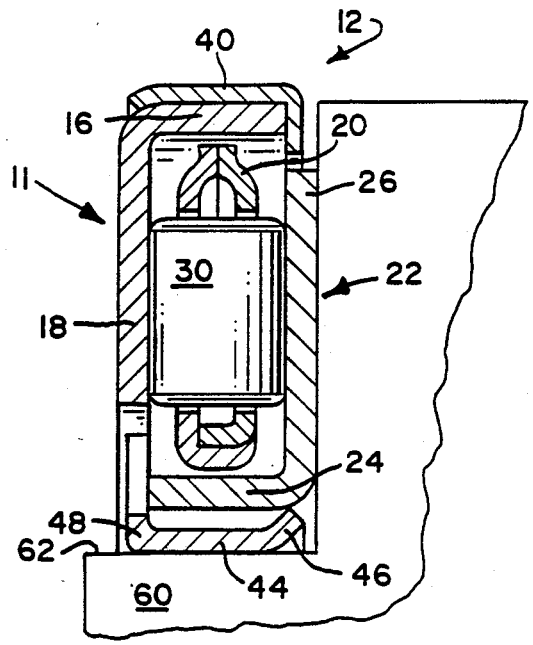
FIG. 5 is a fragmentary view, partially in section, of a modified thrust bearing assembly on a pilot of a shaft.

Turning now to FIG. 5, a modified embodiment of the present invention is illustrated. This embodiment depicts a thrust bearing assembly 12 having its dimples, or protrusions, 44 located on the inner diameter of the assembly. The dimples make a tight interference fit with the pilot surface 62 of shaft 60 so as to limit axial movement of the thrust bearing assembly. In this case, the non-leading edge 48 has a diameter which is smaller than the diameter of shaft 60; thus, an assembler is unable to slide non-leading edge 48 onto the shaft 60.

Figure 6:
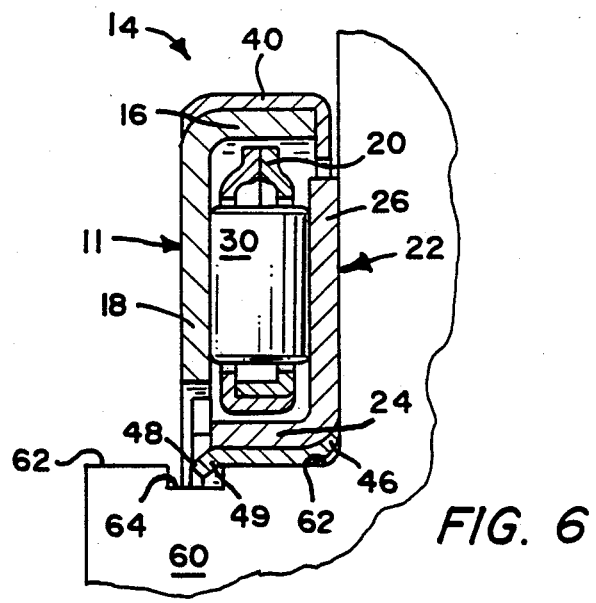
FIG. 6 is another fragmentary view, partially in section, of a second modification of the thrust bearing assembly of the present invention.

Turning now to FIG. 6, a second modified thrust bearing assembly 14 is shown with a lip 49 extending into a groove 64 in the pilot surface 62 of shaft 60 so as to limit axial movement of the bearing assembly. Annular band 40 has no dimples 44 in this embodiment of the invention; instead, band 40 has one or more lips 49. Preferably band 40 has three lips 49, equally spaced around its circumference approximately 120° (degrees) apart, which extend radially outwardly so as to slide over pilot surface 62 when pushed onto shaft 60, but engage groove 64 to prevent thrust bearing assembly 14 from sliding off shaft 60 in the opposite direction. Again, as in FIG. 5, the diameter of shaft 60 is greater than the inner diameter of bearing assembly lips 49 so as to make it impossible to install thrust bearing assembly 14 onto the shaft 60 backwards, since lips 49 will flex outwardly to slide onto pilot surface 62 only when assembly 14 is installed on shaft 60 in the proper direction. Certain modifications may be made to the preferred embodiment of the invention, in addition to those illustrated in FIGS. 5 and 6. For example, the second thrust washer 22 could be eliminated so that rolling elements 30 ride on the facing surface of another member separated from housing 50 (see FIG. 4) by thrust bearing assembly 10. This would allow for a less expensive thrust bearing assembly, as long as the facing surface could serve adequately as a raceway for rolling elements 30.

I claim:

1. For mounting in a housing having a pilot surface and an opening with a pilot surface, a thrust bearing assembly comprising:
   a thrust washer having a radially-extending portion and an axially-extending annular flange, said flange having an outer peripheral edge;
   a plurality of rolling elements adapted to roll along said radially-extending portion of said thrust washer;
   an annular band having an axially-extending annular portion adapted to engage said outer peripheral edge of said thrust washer flange; and
   at least one protrusion extending generally radially-outwardly from said annular band so as to provide an interference fit between said annular band and said pilot surface of said housing, each of said at least one protrusions having a first axial edge and a second axial edge, said first edge being a leading edge having a configuration adapted to facilitate insertion of the protrusion onto said pilot surface of said housing, and said second edge being a non-leading edge having an outer diameter greater than the diameter of said housing opening so as to prevent insertion of said second edge into said housing before said first edge.

2. A bearing assembly in accordance with claim 1, wherein said annular band has three protrusions circumferentially-spaced apart by an approximate 120° arc.

3. A bearing assembly according to claim 1, said assembly further comprising a second thrust washer axially opposite said first thrust washer so that said first and second washers enclose said rolling elements.

4. For mounting on a shaft having a pilot surface with an outer diameter, a thrust bearing assembly comprising:
   a thrust washer having a radially-extending portion and an axially-extending annular flange, said flange having an inner peripheral edge;
   a plurality of roller elements adapted to roll along said radially-extending portion of said thrust washer;
   an annular band having an axially-extending annular portion adapted to engage said inner peripheral edge of said thrust washer flange; and
   at least one protrusion extending generally radially-inwardly from said annular band so as to provide an interference fit between said annular band and said pilot surface of said shaft, each of said at least one protrusions having a first axial edge and a second axial edge, said first edge being a leading edge having a configuration adapted to facilitate installation of said protrusion onto said pilot surface of said shaft, and said second edge being a non-leading edge having an inner diameter smaller than said outer diameter of said shaft pilot surface so as to prevent installation of said second edge onto said shaft before said first edge.

5. A bearing assembly in accordance with claim 4, wherein said band has three protrusions circumferentially-spaced apart by an approximately 120° arc.

6. A bearing assembly according to claim 4, said assembly further comprising a second thrust washer axially opposite said first thrust washer so that said first and second washers enclose said rolling elements.

7. A thrust bearing assembly adapted to be supported by a support having a pilot surface comprising:
   a thrust washer having a radially-extending portion and an axially-extending annular flange;
   a plurality of rolling elements adapted to roll along said radially-extending portion of said thrust washer;
   an annular band having an axially-extending annular portion adapted to engage a peripheral edge of said thrust washer flange; and
   at least one protrusion extending in a generally radial direction from said annular band so as to provide an interference fit between said annular band and said pilot surface of said support, each of said at least one protrusions having a first axial edge and a second axial edge, said first edge being a leading edge having a configuration adapted to facilitate insertion of the protrusion along said pilot surface of said support, and said second edge being a non-leading edge having a diameter such that insertion of said second edge along said pilot surface before said first edge is prevented.

* * * * *